(12) United States Patent
Runfola et al.

(10) Patent No.: US 6,601,983 B1
(45) Date of Patent: Aug. 5, 2003

(54) LED VEHICULAR LIGHT ASSEMBLY WITH HEATER

(76) Inventors: Vincent A. Runfola, 544 Spring Hollow Blvd., Apopka, FL (US) 32703; Robert Fernandez, 10301 NW. 108th Ave., Miami, FL (US) 33178

( * ) Notice: Subject to any disclaimer, the term of this patent is extended or adjusted under 35 U.S.C. 154(b) by 0 days.

(21) Appl. No.: 09/907,055

(22) Filed: Jul. 18, 2001

(51) Int. Cl.[7] .............................................. F21V 21/00
(52) U.S. Cl. ..................... 362/545; 362/800; 362/235; 362/92; 219/202; 219/220
(58) Field of Search .................... 362/800, 92, 294, 362/545, 494, 235; 359/507; 219/201, 202, 220; 313/15; 250/495.1

(56) References Cited

U.S. PATENT DOCUMENTS

| | | | | |
|---|---|---|---|---|
| 5,151,824 A | * | 9/1992 | O'Farrell | 359/604 |
| 5,497,306 A | * | 3/1996 | Pastrick | 362/226 |
| 5,765,940 A | | 6/1998 | Levy | |
| 5,785,418 A | * | 7/1998 | Hochstein | 362/373 |
| 6,354,714 B1 | * | 3/2002 | Rhodes | 362/153.1 |
| 6,419,382 B1 | * | 7/2002 | Nakagawa et al. | 362/547 |

FOREIGN PATENT DOCUMENTS

JP 2002150812 A * 11/2000

OTHER PUBLICATIONS

Minco Products "Thermal–Clear Heaters" Advertisement.

* cited by examiner

*Primary Examiner*—Thomas M. Sember
(74) *Attorney, Agent, or Firm*—Alvin S. Blum

(57) ABSTRACT

A light assembly for mounting on the exterior of a vehicle such as a taillight, a stop light, or a turn signal is provided with a plurality of light emitting diodes (LED's). These have distinct advantages over incandescent bulbs for longer life and reduced power. They have the disadvantage that they are so energy efficient that they do not heat up the external lens enough to melt snow and ice thereon. The invention overcomes this problem by providing an electrical heater in the assembly that is actuated by a thermal switch that is closed only when the temperature is below a preset value.

12 Claims, 3 Drawing Sheets

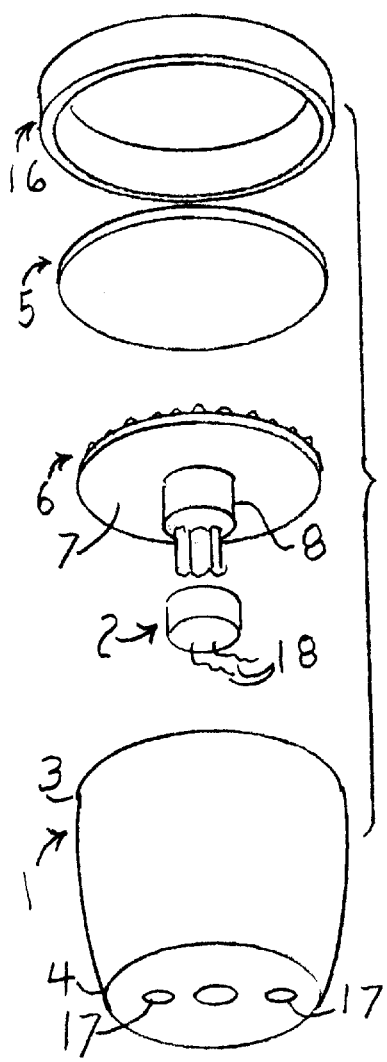
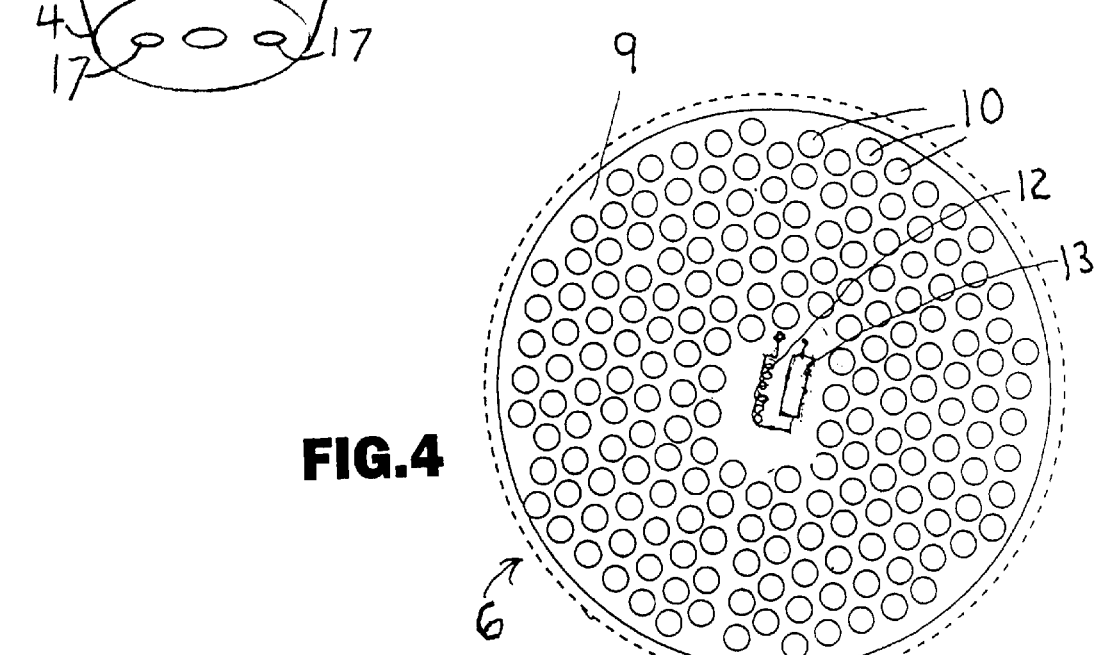
FIG. 3
FIG. 4

LED VEHICULAR LIGHT ASSEMBLY WITH HEATER

BACKGROUND OF THE INVENTION

This invention relates to LED light assemblies for the exterior of vehicles, and more particularly to such assemblies that also incorporate an electrical heater for melting snow and ice that may form on the external lens of such an assembly in cold weather.

DESCRIPTION OF THE PRIOR ART

LED lamp assemblies for use on the exterior of motor vehicles are well known in the art, as exemplified by U.S. Pat. No. 5,765,940 issued Jun. 16, 1998 to Levy et al. They have distinct advantages over the more commonly used incandescent bulbs. They have much longer useful lives, so there is less danger of unknowingly driving without the safety features the lamp is designed to provide. They are also more efficient, because a much greater portion of the electrical energy they consume is converted to useful light of the desired color. By contrast, the incandescent bulb they replace generates white light. A filtering lens absorbs the colors not desired converting it to heat, and passes only the red or yellow light required. And much of the energy is converted directly to heat. Very little of the electrical energy applied to an LED is converted to heat. While this is a distinct advantage of the LED in most situations, it poses a serious problem in cold climates. When ice or snow accumulates on the lens of the lamp housing, the incandescent lamp generates enough heat to melt the snow and ice so that it falls off and clears the lens. However, the LED assembly does not produce enough heat to do this. It is too much effort for a driver to manually clear the lamps. Consequently, these LED lamp assemblies have not been accepted in the colder climates. It would be useful to provide LED lamp assemblies that would apply enough heat to the lens to clear it of snow and ice as needed.

SUMMARY OF THE INVENTION

It is accordingly an object of the invention to provide an LED lamp assembly for the exterior of a motor vehicle that would generate enough heat to clear the lens of ice and snow. It is another object that such an assembly provide no heating when it is not needed so as to conserve energy and reduce stress on the LED's. The heating means of the invention is connected to the electric power source through a switch that closes only when the temperature is low enough for ice and snow to accumulate on the lens. The heating means may take various forms. It may be a resistor, an infra red emitter, a resistance element embedded in the lens, or a resistance film on the lens, for example.

These and other objects, features, and advantages of the invention will become more apparent when the detailed description is studied in conjunction with the drawings in which like elements are designated by like reference characters in the various drawing figures.

BRIEF DESCRIPTION OF THE DRAWINGS

FIG. 3 is an exploded view of the device of FIG. 1.

FIG. 4 is a top view of the LED board assembly.

DETAILED DESCRIPTION OF PREFERRED EMBODIMENTS

Figure 1:
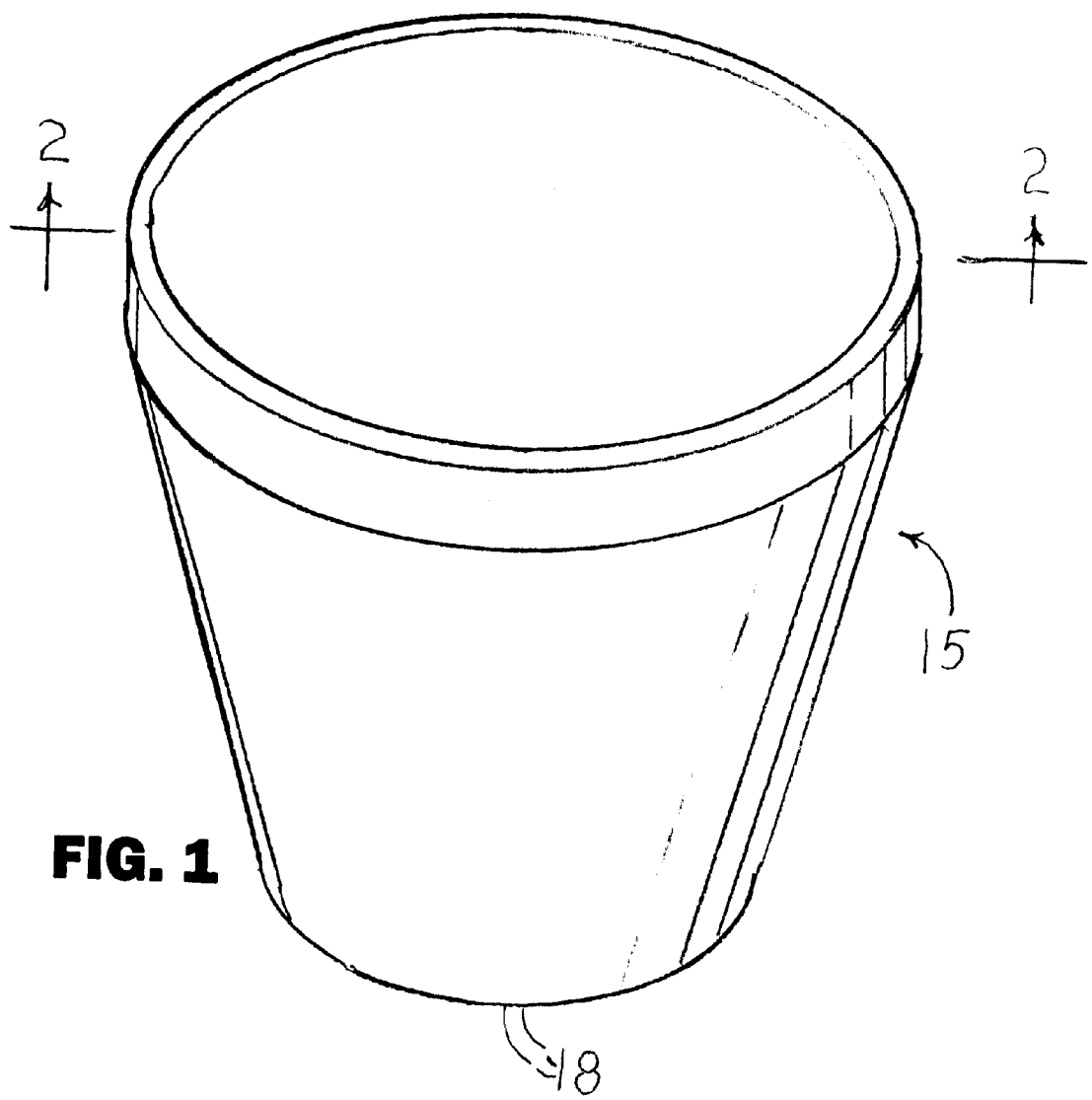
FIG. 1 is a perspective side view of a vehicle exterior light of the invention.
Figure 2:
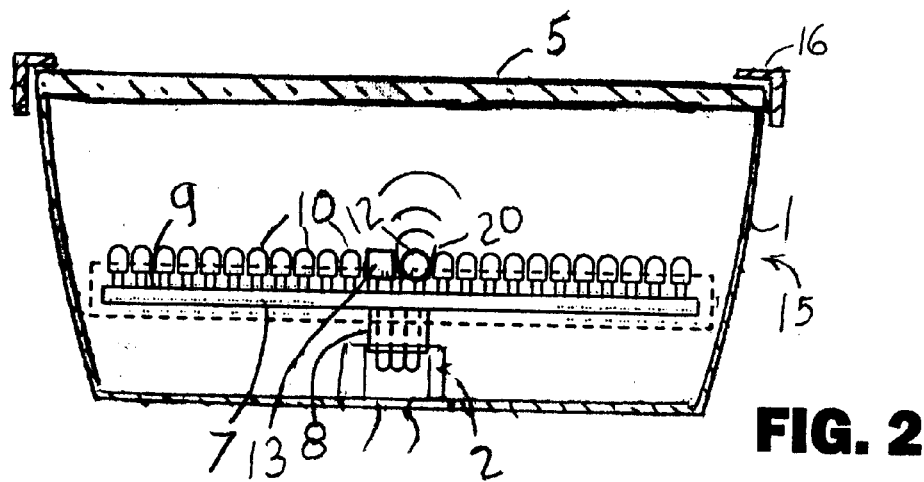
FIG. 2 is a sectional view taken on line 2—2 of FIG. 1.

Referring now to the drawing FIGS. 1–4, a light assembly 15 of the invention such as a truck taillight, stoplight, or turn signal comprises an enclosure 1 of conventional design with a plastic or glass lens 5 held in place at a second end 4 by a bezel 16. The enclosure may be of metal held in place on the exterior of a vehicle body by bolts through apertures 17. The metal enclosure may provide electrical ground for the electrical power supply connection 2 at the first end 3 of the enclosure. Alternatively both positive and negative electrical power may be supplied by wires 18 to electrical supply connection 2. LED board assembly 6 includes a board 19 having a first face 7 with an electrical connector 8 extending therefrom for operative engagement with connection 2. A plurality of light emitting diodes (LED's) 10 extend from the opposed second face 9 and are wired to connector 8 so as to emit light through lens 5.

Also wired to the connector 8 through thermal switch 13 is heating element 12 mounted on the board. A reflector 20 directs the heat toward the lens to melt any snow or ice thereon. The thermal switch 13 is a bimetallic switch that remains closed below a preset temperature such as 35 degrees Fahrenheit. By opening above that temperature, the board assembly avoids overheating. The heating element may be a simple resistor or infra red emitter, for example.

Figure 5:
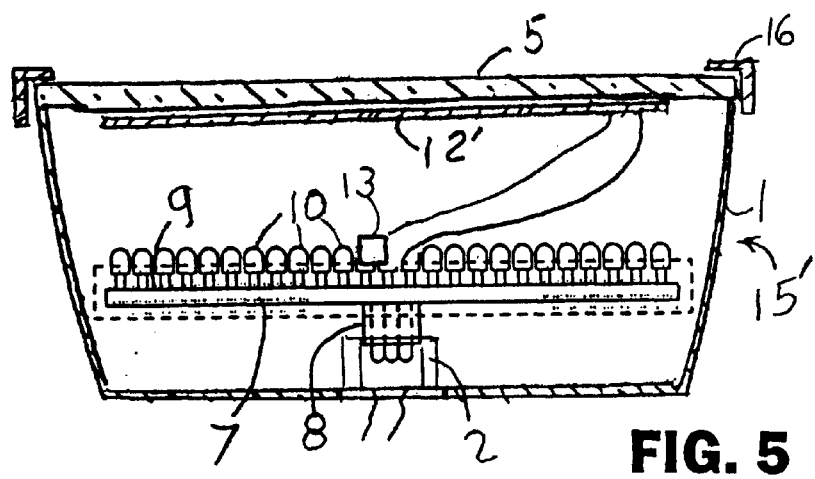
FIG. 5 is a sectional view as in FIG. 2 of another embodiment of the invention.

Referring now to FIG. 5, another embodiment 15' of the invention is shown in which the thermal switch 13 is mounted on the board. The resistive heating element 12' to which it is connected is a transparent film with fine resistor wires such as, for example, the THERMAL-CLEAR trademarked heaters from Minco Products, inc. This is provided with flexible wires and a pressure sensitive adhesive surface for direct application to the underside of the lens.

Figure 6:
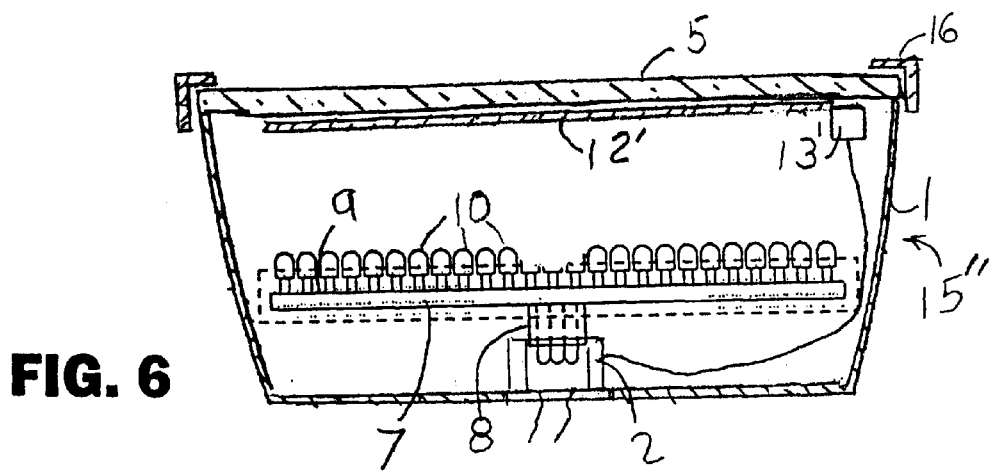
FIG. 6 is a sectional view as in FIG. 2 of another embodiment of the invention.

Referring now to FIG. 6, another embodiment 15" of the invention is shown in which the thermal switch 13' is mounted on the electrical supply connection 2'. The resistive heating element 12' to which it is connected is a transparent film with fine resistor wires such as, for example, the THERMAL-CLEAR trademarked heaters from Minco Products, inc. This is provided with flexible wires and a pressure sensitive adhesive surface for direct application to the underside of the lens.

Figure 7:
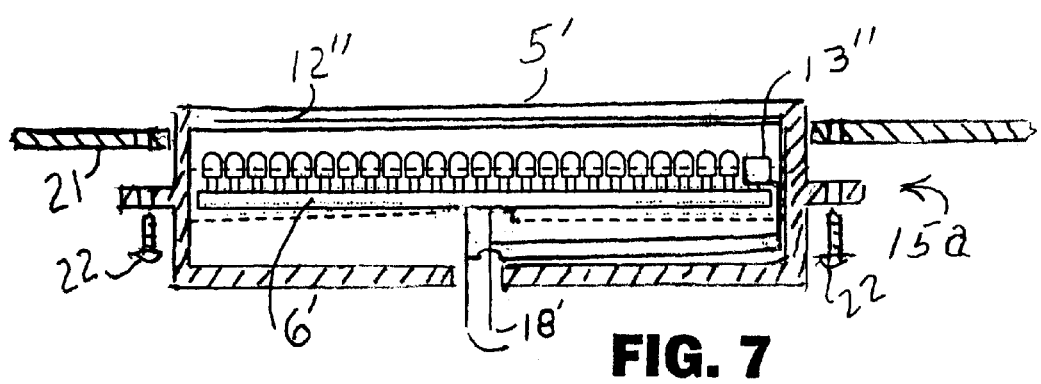
FIG. 7 is a sectional view as in FIG. 2 of another embodiment of the invention.

Referring now to the drawing of FIG. 7, another embodiment of the invention is shown in which the entire vehicular light assembly 15a is molded in one piece for inserting into an aperture in a vehicle body 21 and securing with screws 22. This has cosmetic advantages and prevents theft. The integral lens 5' has fine resistance wires 12" embedded in the lens to provide the heating element that is energized by thermal switch 13". The LED board 6' is cemented in place. The electric power to the LED's and to the thermal switch and heating element are supplied through common wires 18' which exit the assembly 15a and are connected to the vehicle power (not shown).

While we have shown and described the preferred embodiments of my invention, it will be understood that the invention may be embodied otherwise than as herein specifically illustrated or described, and that certain changes in form and arrangement of parts and the specific manner of practicing the invention may be made within the underlying idea or principles of the invention.

What is claimed is:

1. An LED light assembly for mounting on the exterior of a motor vehicle, the light assembly comprising:
   a) an enclosure having an electric supply connection at a first end and a light transmitting lens at a second end;
   b) an LED board assembly within the enclosure having a first face and an opposed second face;
   c) an electrical connector extending from the first face constructed for operatively connecting with the supply connection;
   d) a plurality of LED's fixedly mounted on the second face so as to emit light through the lens when the board assembly is within the enclosure and the connector is engaged with the supply connection;
   e) electrical connection between the connector and the LED's for energizing the LED's;
   f) a heating element within the enclosure for generating heat for clearing ice and snow from the lens when electrically powered;
   g) electrical connecting means between the heating element and the electric supply connection for supplying electric power to the heating element only when the temperature falls below a preset value; and
   h) in which the heating element is mounted on the LED board assembly.

2. The light assembly according to claim 1, in which the electrical connecting means includes a thermal switch that is closed below a preset temperature.

3. The light assembly according to claim 2, in which the thermal switch includes a bimetallic element.

4. In a light assembly mounted on the exterior of a motor vehicle having an enclosure with an electric supply connection at a first end and a light transmitting lens at a second end, the improvement comprising:
   a) an LED board assembly having a first face and an opposed second face;
   b) an electrical connector extending from the first face constructed for operatively connecting with the supply connection;
   c) a plurality of LED's fixedly mounted on the second face so as to emit light through the lens when the board assembly is within the enclosure and the connector is engaged with the supply connection;
   d) electrical connection between the connector and the LED's for energizing the LED's;
   e) a heating element for generating heat for clearing ice and snow from the lens when within the enclosure and electrically powered;
   f) electrical connecting means between the heating element and the electric supply connection for supplying electric power to the heating element only when the temperature falls below a preset value; and
   g) in which the heating element is mounted on the LED board assembly.

5. The light assembly according to claim 4, in which the electrical connecting means includes a thermal switch that is closed below a preset temperature.

6. The light assembly according to claim 5, in which the thermal switch includes a bimetallic element.

7. An LED light assembly for mounting on a motor vehicle, the light assembly comprising:
   a) an enclosure having an electric supply connection at a first end and a light transmitting lens at a second end, the lens having an outer face exposed to the environment and an opposed inner face;
   b) an LED board assembly having a first face and an opposed second face;
   c) electrical connection means extending from the first face constructed for operatively connecting with the supply connection;
   d) a plurality of LED's fixedly mounted on the second face so as to emit light through the lens when the board assembly is within the enclosure and the connection means is engaged with the supply connection;
   e) electrical connection between the connection means and the LED's for energizing the LED's;
   f) a heating element within the enclosure for generating heat for clearing ice and snow from the lens when electrically powered;
   g) electrical connecting means between the heating element and the electric supply connection for supplying electric power to the heating element only when the temperature falls below a preset value; and
   h) in which the heating element is constructed for mounting on the lens.

8. In a light assembly mounted on the exterior of a motor vehicle having an enclosure with an electric supply connection at a first end and a light transmitting lens at a second end, the improvement comprising:
   a) an LED board assembly having a first face and an opposed second face;
   b) an electrical connector extending from the first face constructed for operatively connecting with the supply connection;
   c) a plurality of LED's fixedly mounted on the second face so as to emit light through the lens when the board assembly is within the enclosure and the connector is engaged with the supply connection;
   d) electrical connection between the connector and the LED's for energizing the LED's;
   e) a heating element for generating heat for clearing ice and snow from the lens when within the enclosure and electrically powered; and
   f) electrical connecting means between the heating element and the electric supply connection for supplying electric power to the heating element only when the temperature falls below a preset value.

9. The light assembly according to claim 8, in which the heating element is mounted on the LED board assembly.

10. The light assembly according to claim 8, in which the heating element is mounted on the inner face of the lens.

11. The light assembly according to claim 8, in which the heating element comprises resistance wires attached to the inner face.

12. The light assembly according to claim 8, in which the heating element is embedded in the lens.

* * * * *